(12) United States Patent
King et al.

(10) Patent No.: US 8,046,570 B2
(45) Date of Patent: Oct. 25, 2011

(54) SUPPORTING MULTIPLE OPERATING SYSTEMS IN MEDIA DEVICES

(75) Inventors: Brian Douglas King, Carnation, WA (US); James C. Finger, Kirkland, WA (US); Praful Prataprai Chavda, Redmond, WA (US); Jeffrey Alan Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 11/999,605

(22) Filed: Dec. 6, 2007

(65) Prior Publication Data

US 2008/0189538 A1    Aug. 7, 2008

Related U.S. Application Data

(60) Provisional application No. 60/899,909, filed on Feb. 6, 2007.

(51) Int. Cl.
*G06F 9/00* (2006.01)
*G06F 9/24* (2006.01)
*G06F 15/177* (2006.01)

(52) U.S. Cl. ............ 713/1; 713/2; 713/100; 386/361
(58) Field of Classification Search .................. None
See application file for complete search history.

(56) References Cited

U.S. PATENT DOCUMENTS

| | | | |
|---|---|---|---|
| 5,623,696 A | 4/1997 | Johnson et al. | |
| 6,631,101 B1 * | 10/2003 | Chan et al. | 369/30.36 |
| 6,654,827 B2 | 11/2003 | Zhang et al. | |
| 6,763,458 B1 | 7/2004 | Watanabe et al. | |
| 7,062,766 B2 | 6/2006 | Ronkka et al. | |
| 7,356,677 B1 * | 4/2008 | Rafizadeh | 713/1 |
| 7,657,734 B2 * | 2/2010 | Vesterinen et al. | 713/2 |
| 2003/0060911 A1 * | 3/2003 | Chan et al. | 700/94 |
| 2003/0135771 A1 | 7/2003 | Cupps et al. | |
| 2004/0226020 A1 | 11/2004 | Birmingham | |
| 2005/0066000 A1 | 3/2005 | Liaw et al. | |
| 2005/0193267 A1 * | 9/2005 | Liu et al. | 714/38 |
| 2005/0210117 A1 * | 9/2005 | Wu et al. | 709/208 |
| 2005/0223219 A1 | 10/2005 | Gatto et al. | |
| 2006/0010314 A1 | 1/2006 | Xu | |
| 2006/0133362 A1 | 6/2006 | Stein et al. | |
| 2006/0155914 A1 | 7/2006 | Jobs et al. | |
| 2006/0168440 A1 | 7/2006 | Huang | |
| 2006/0179326 A1 | 8/2006 | Leung | |

(Continued)

FOREIGN PATENT DOCUMENTS

EP    1037133    9/2000

(Continued)

OTHER PUBLICATIONS

Online forum posting by user "rdewey" ("Help—playing HD-DVD & Blu-ray", retrieved from the World Wide Web at http://www.avsforum.com/avs-vb/showthread.php?t=786783), posted on Jan. 14, 2007, pp. 2.*

(Continued)

*Primary Examiner* — Ji H Bae
(74) *Attorney, Agent, or Firm* — Klarquist Sparkman, LLP

(57) ABSTRACT

Techniques and tools for supporting multiple operating systems in consumer electronic devices. For example, techniques and tools are described that allow quickly switching between operating systems in video disc players that support different media types while reducing wait time and mitigating possible negative impacts to user experience.

64 Claims, 7 Drawing Sheets

U.S. PATENT DOCUMENTS

| | | | |
|---|---|---|---|
| 2006/0227806 A1 | 10/2006 | Tseng | |
| 2006/0291800 A1* | 12/2006 | Uehara | 386/83 |
| 2007/0150592 A1 | 6/2007 | Bell | |
| 2008/0133903 A1* | 6/2008 | Sun et al. | 713/100 |
| 2010/0306773 A1* | 12/2010 | Lee et al. | 718/1 |

FOREIGN PATENT DOCUMENTS

| | | |
|---|---|---|
| WO | 01/46819 | 6/2001 |

OTHER PUBLICATIONS

Anonymous, "Dynamic Resource Management for Hibernation Swapping of PRE-Hibernated OS Image," *IP.COM Journal*, 1 pp. (Sep. 29, 2003).

Supplementary European Search Report dated Oct. 29, 2009, from European Patent Application No. EP 08705919.2, 11 pp.

International Search Report dated May 8, 2008, from International Patent Application No. PCT/US2008/051045, 3 pp.

Written Opinion dated May 8, 2008, from International Patent Application No. PCT/US2008/051045, 3 pp.

Bedwell, "OMTP Product Profile Process Sees Early Phase Adoption," *OMTP*, 3 pp., downloaded from the World Wide Web at http://www.omtp.org/pr-product-profile.html (marked Nov. 28, 2006).

Liming, "Dual-Booting Tips for Windows XP Embedded," *Microsoft Corporation*, 5 pp., downloaded from the World Wide Web at http://msdn2.microsoft.com/en-us/library/aa460112.aspx (marked Mar. 2005).

Anonymous, "Mac OS X vs Linux on the iPhone and Mobile Devices," 5 pp., downloaded from the World Wide Web at http://www.roughlydrafted.com/RD/RDM.Tech.Q1.07/8510F3F6-AA84-4324-8882-1319FB939E8A.html (marked Feb. 2007).

MobileTrax, "Scandinavian Breakfast as a Metaphor for Wireless Email: A Dialog with Nokia Marketing," downloaded from the World Wide Web, 3 pp., downloaded from the World Wide Web at http://www.mobiletrax.com/im/2004archives/20040915.html, (marked Sep. 13, 2004).

Paul, "LG Cuts Price of Dual HD DVD Player," *Yahoo News*, 1 p., downloaded from the World Wide Web at http://news.yahoo.com/20070905 (marked Sep. 5, 2007).

Wikipedia, "Ioctl," 2 pp., downloaded from the World Wide Web at http://en.wikipedia.org/wiki/Ioctl (marked Aug. 28, 2007).

\* cited by examiner software 180 implementing described strategies for supporting multiple operating systems in media devices

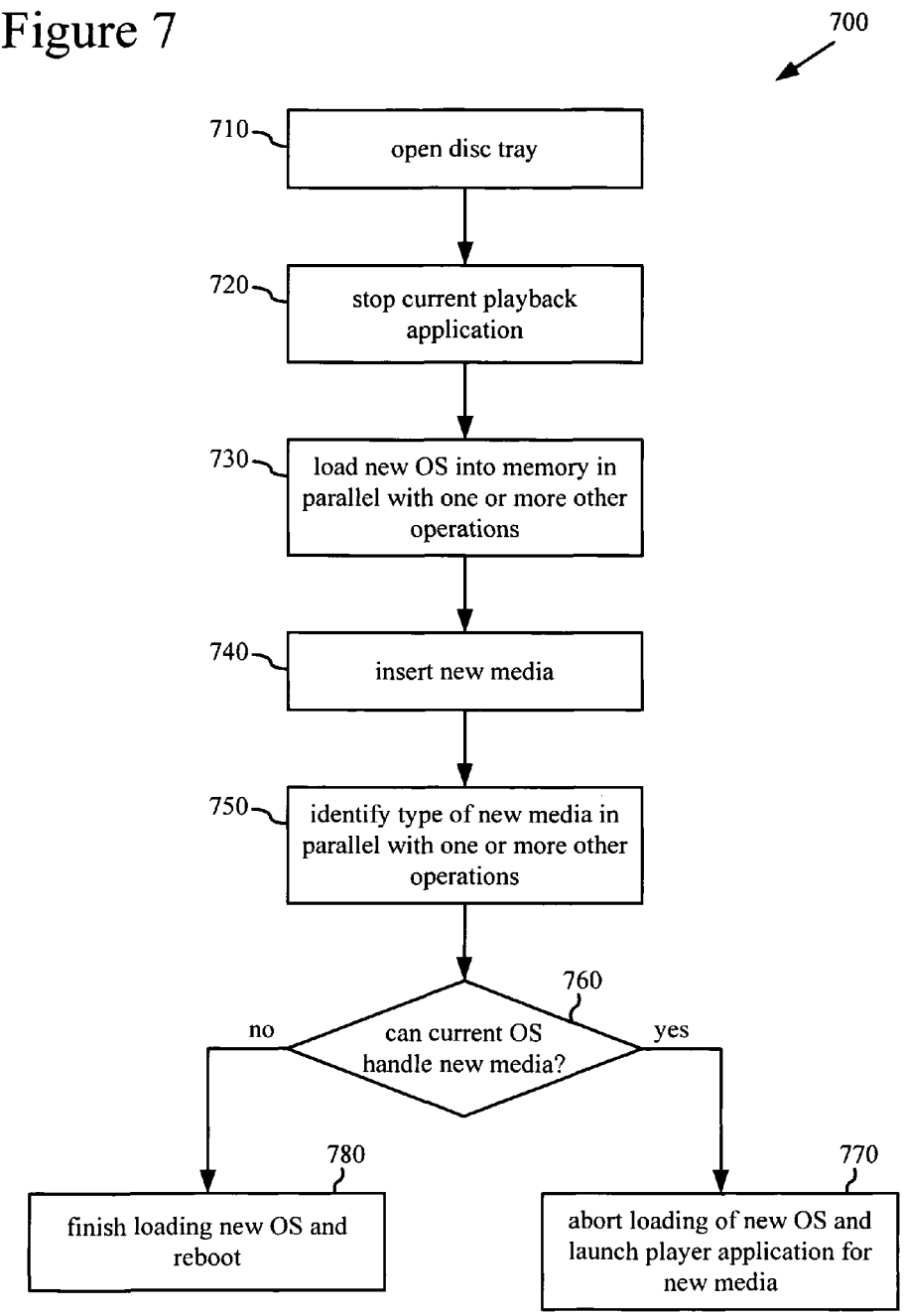

SUPPORTING MULTIPLE OPERATING SYSTEMS IN MEDIA DEVICES

RELATED APPLICATION INFORMATION

This application claims the benefit of U.S. Provisional Patent Application No. 60/899,909, filed Feb. 6, 2007, the disclosure of which is hereby incorporated by reference.

BACKGROUND

Media formats for consumer electronics devices are becoming increasingly complicated, while also moving much of their advanced functionality from hardware to software. As a result, the software environments of consumer electronics devices have become increasingly complicated.

In addition, older and simpler formats such as DVD still leave some of their processing to software even though they offload much of their processing to cheaper and simpler hardware. For example, while audio and video streams are likely to be decoded by dedicated hardware, menu processing (or "navigation") functionality may be implemented in software. While basic navigation software can be relatively simple, the DVD market has evolved over time. DVD players have responded with complicated menu processing logic to correctly handle DVDs with more features. As a result, the relatively simple DVD format has evolved so that its playback software is now quite complicated. Many player manufacturers have a significant investment in this software, and the software has evolved over time to have dependencies on their operating environments.

With different media formats available, there exists a need for consumer electronics devices that support multiple formats. For example, when one considers that users generally expect their DVD player to also play CD Audio discs, which is a very different media format, it becomes clear that supporting multiple formats is desirable. A problem to be addressed, then, is how to run multiple software applications that may require their own operating systems in a cost-effective manner.

SUMMARY

This Summary introduces a selection of concepts in a simplified form that are further described below in the Detailed Description. This Summary is not intended to identify key features or essential features of the claimed subject matter, nor is it intended to be used to limit the scope of the claimed subject matter.

In summary, the Detailed Description is directed to various techniques and tools for supporting multiple operating systems in consumer electronic devices. For example, techniques and tools are described that allow quickly switching between operating systems in video disc players that support different media types while reducing wait time and mitigating possible negative impacts to user experience.

Additional features and advantages will be made apparent from the following detailed description of various embodiments that proceeds with reference to the accompanying drawings.

BRIEF DESCRIPTION OF THE DRAWINGS

FIG. 7 is a flow chart showing an example technique for performing warm-boot media format switching operations in parallel according to one or more described implementations.

DETAILED DESCRIPTION

Techniques and tools for supporting multiple operating systems, e.g., in embedded devices such as media players, are described herein.

Various alternatives to the implementations described herein are possible. For example, certain techniques described with reference to flowchart diagrams can be altered by changing the ordering of stages shown in the flowcharts, by repeating or omitting certain stages, etc., while achieving the same result. Different embodiments implement one or more of the described techniques and tools. Some of the techniques and tools described herein address one or more of the problems noted in the Background. Typically, a given technique/tool does not solve all such problems, however.

I. Computing Environment

Figure 1:
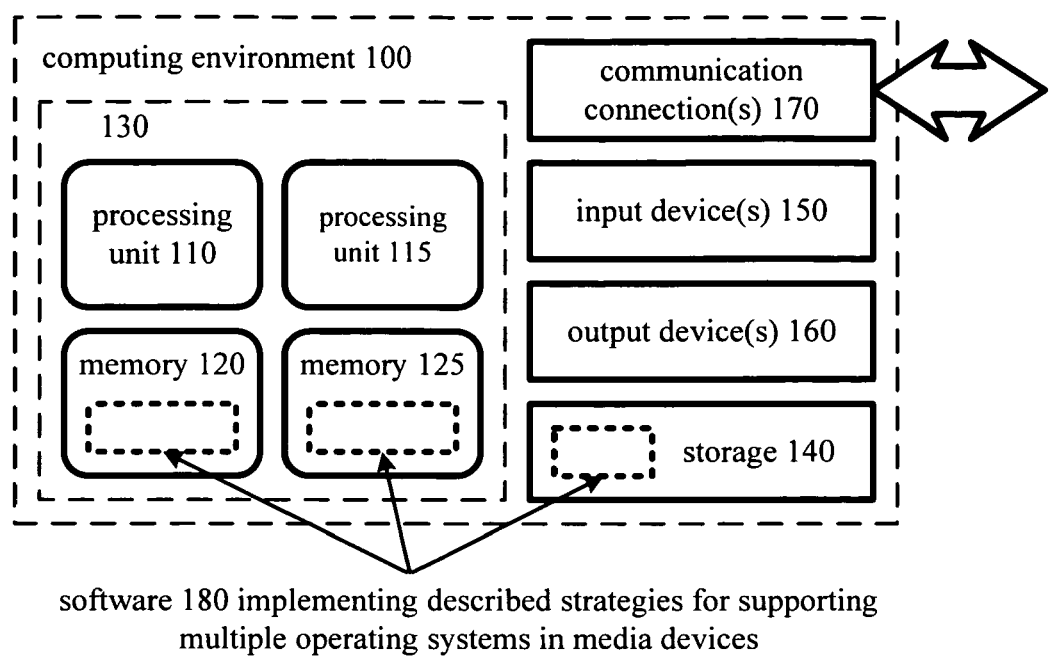
FIG. 1 is a block diagram illustrating a generalized example of a suitable computing environment in which several of the described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments. For example, the computing environment (100) can be provided with a media device such as a portable audio player, portable video player, portable audio and video player, console audio player, console video player or console audio and video player. Such a media device can be a stand-alone unit or included in another device (e.g., communications device or display unit).

With reference to FIG. 1, the computing environment (100) includes at least two processing units (110, 115) and associated memory (120, 125). The processing units (110, 115) may include a CPU, a GPU for video acceleration, or other co-processing units. In FIG. 1, this most basic configuration (130) is included within a dashed line. Alternatively, the computing environment includes a single processing unit. The processing units (110, 115) execute computer-executable instructions and may be real or virtual processors. In a multi-processing system, multiple processing units execute computer-executable instructions to increase processing power. In encoding or decoding scenarios, a host encoder or decoder process uses available processing units (110, 115) to perform encoding or decoding operations. Certain operations may be performed by a specialized processing unit such as a GPU. The memory (120, 125) may be volatile memory (e.g., registers, cache, RAM), non-volatile memory (e.g., ROM, EEPROM, flash memory, etc.), or some combination of the two. The memory (120, 125) may be specific to one processor or shared by two or more processors. The memory (120, 125) stores software (180) for a device implementing strategies for supporting multiple operating systems.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180).

The input device(s) (150) may be a touch input device such as a keyboard, mouse, pen, touch screen, or trackball, a voice input device, a scanning device, or another device that provides input to the computing environment (100). For audio or video, the input device(s) (150) may be a sound card, video card, TV tuner card, or similar device that accepts audio or video input in analog or digital form, or a DVD, CD-ROM or CD-RW that reads encoded audio or video into the computing environment (100). The output device(s) (160) may be a display, printer, speaker, CD- or DVD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, radio frequency ("RF"), infrared ("IR"), acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "check" and "wake" to describe computer operations in a computing environment. These terms are high-level abstractions for operations performed by a computer, and should not be confused with acts performed by a human being. The actual computer operations corresponding to these terms vary depending on implementation.

II. Strategies for Supporting Multiple Operating Systems in Consumer Electronics Devices Consumer electronics devices are becoming increasingly complicated and are moving support for much of their functionality from hardware to software. Older and simpler formats such as DVD often leave some of their processing to software even though they typically offload much of their processing to cheaper and simpler hardware. For example, audio and video streams can be decoded by dedicated hardware, while menu processing (or "navigation") functionality can be implemented in software. As a result, some consumer electronics devices that support relatively simple formats such as DVD nonetheless have evolved to have complicated software.

In addition, playback tools for different media formats may have different operating system requirements and may further complicate the software environments of devices that handle them. For example, high-definition video content encoded according to the HD DVD video disc standard (sometimes referred to herein as HD DVD format) can be decoded using a playback application supported by a first operating system (such as the Windows® CE operating system from Microsoft Corporation or other operating system), and high-definition video content encoded according to the Blu-ray video disc standard (sometimes referred to herein as Blu-ray format) can be decoded using a playback application supported by a second operating system (such as a Linux-based operating system, other Unix-like or Unix variant operating system, or other operating system). Dual-format discs (e.g., discs with content in Blu-ray format and content in HD DVD format) may have still other operating system requirements. Some software designed for particular operating environments has evolved over time to have dependencies on those operating environments. As a result of these and other factors, consumer electronics devices have increasingly complicated software environments.

A problem to be addressed by consumer electronics devices is how to run multiple software applications (each of which may require its own operating system) in a cost-effective manner. One solution is to include a processor, complete with operating system and software application, for each type of media format supported. A more cost-effective solution is to store multiple operating systems and software applications (e.g., up to one operating system and software application per media format) and have the player reboot when a different type of media is processed. For example, a player could have one operating system for HD DVD, another for DVD, and another for CD Audio. The mapping between operating systems and supported applications need not be one-to-one. For example, DVD and CD Audio playback might run on one operating system, while HD DVD playback runs on a different operating system.

However, there are potential problems associated with running multiple operating systems. Consider a device that supports two digital video disc media formats: the HD DVD format running on a first operating system, and the Blu-ray format (sometimes referred to as Blu-ray Disc format) running on a second operating system very different than the first operating system. One issue to be considered is disc loading time when transitioning from one format to another (e.g., from Blu-ray playback, supported using the second operating system, to HD DVD-Video playback, supported using the first operating system). Another issue to be considered is how to allow users to switch between multiple software applications (that require their own operating systems) while keeping the switch between operating systems invisible to the user to reduce the potential negative impact on user experience. Described "multi-boot" techniques and tools allow devices to switch between operating systems at low cost and without undue interference to user experience. In the descriptions herein, the term "dual-boot" is sometimes used to describe a device that switches between two operating systems, although the ideas discussed herein can be extended to devices that are capable of running more than two operating systems. Dual-boot devices with two available operating systems are a subset of multi-boot devices, which can have two or more available operating systems. The terms multi-boot and dual-boot do not indicate a requirement that the device must reboot to switch between operating systems, as explained in detail below.

Options for multi-boot designs include the following.
1. Operating system transitions are handled with a cooperative handoff (or graceful handoff) mechanism in which two or more operating systems are operating simultaneously. For example, in a described implementation a handoff between a first operating system and a second operating system is performed while both first and second operating systems are kept running. One operating system is left in an idle state after the handoff.
2. Operating system transitions are handled with a hand-off mechanism that involves a warm boot to one of the operating systems. The term "warm boot" is used herein to refer to a boot of an operating system on a device that occurs after the device has already been powered on, with an operating system loaded.

Selection between multi-boot design options can depend on a number of factors, such as: chip selection (e.g., single core or dual core), cost of implementation and external dependencies. Many chip designs have a single processor core and support one operating system at a time (unless low-level hardware threading or another technology provides support for simultaneously running multiple operating systems). Other chip designs have two processor cores, and a single symmetric multiprocessing-aware operating system typically does not use both of them. In any case, system-on-a-chip design choices often depend on more than just the processor core(s), also considering other functional units on a chip such as units for audio/video decoding, 2D graphics acceleration, decryption, etc.

A. EXAMPLES

The following examples illustrate techniques for handling transitions between operating systems and account for such factors as transition time and potential impact on user experience. Examples in this section describe switching between two operating systems, but it is possible to switch between more than two operating systems. In alternative implementations, the steps shown in the examples below can be reordered, omitted or replaced with different steps. For example, examples that describe switching from operating system A to operating system B can be extended to switch back to operating system A by default after a requested feature of operating system B is no longer being used, or in response to a subsequent user action that uses a feature in operating system A. Transitions between operating systems can continue as long as needed or desired. Examples in which operating system A is an initial, primary operating system can be modified so that operating system B is the initial, primary operating system, or vice versa.

The examples are implemented with a digital media player, which can be a stand-alone device or included as part of another device. Alternatively, the examples are implemented with another consumer electronics device or other computing device.

1. Graceful-Handoff Examples

Example 1

In this graceful-handoff scenario, a consumer electronics device is configured to allow operating system A and operating system B to run simultaneously. In this example, operating system A is the primary operating system and currently controls most aspects of the device. It detects that a user is attempting to use a feature provided by operating system B (e.g., by putting a video disc of a particular format into the device). The process of Example 1 includes the following steps:
1. Store the identified feature requirement(s) (e.g., in non-volatile storage).
2. Release control of hardware resources which will be used by operating system B (if necessary).
3. Transfer control to operating system B.
4. Determine (with operating system B) the feature required by reading the data stored in Step 1, above.
5. Activate, if necessary, and use (with operating system B) the necessary hardware resources to satisfy the feature's requirements. The transition from one operating system to another can be performed gracefully for some hardware resources (e.g., displays), such that their state (e.g., currently displaying a menu) is completely or partially persisted across the handoff from operating system A to operating system B in order to reduce transition time and/or mitigate negative impact on user experience.
6. Provide (with operating system B) the desired feature.

In Step 3 of Example 1, control is transferred to operating system B by sending one or more messages to operating system B. These messages can be implemented in several ways. For example, in some implementations, each operating system/processor core (where operating system A runs on processor core A, and operating system B runs on processor core B) has a driver in it which implements a hardware mailbox queue. The mailbox queues can be simple first-in-first-out queues used for messaging between operating system A and operating system B. A controlling component for the operating system (e.g., in the driver) waits for a message to arrive in its queue to instruct it to put its operating system and core to sleep. The message can be a word of memory whose values are reserved for purposes of graceful handoffs between the operating systems (e.g., the value 1 indicates the controlling component should put its operating system/core to sleep, the value 2 indicates the controlling component should wake its operating system/core from a sleep state, and other values are reserved for other purposes). Alternatively, the messaging is implemented with another protocol and/or another type of data structure.

In an example mailbox-queue implementation, when operating system A detects a disc in a format that it does not play, it sends a message (e.g., with a value of 2) to its messaging driver, which delivers the message to the mailbox queue of the driver of operating system B. The driver for operating system B waits for messages in its mailbox queue, receives the message from operating system A, interprets the message (whose value indicates "wake up"), and takes steps to wake up operating system B and core B (for example, re-enabling drivers as appropriate). Operating system A puts itself to sleep after it sends the wake-up message to operating system B, assuming that operating system B will successfully wake. Alternatively, operating system A waits for a message from operating system B (e.g., with a value of 1) instructing operating system A to put itself in sleep mode. Having operating system B send such a message after operating system B has successfully woken allows for better error handling—if operating system A does not get such a sleep message after some period of time, operating system A can initiate error handling by informing the user, rebooting the entire system and/or taking another step.

The messaging process is reversed if operating system B encounters a disc in a format that it does not play. Operating system B sends a message (e.g., with a value of 2) to its messaging driver, which delivers the message to the mailbox queue of the driver of operating system A. The driver for operating system A waits for messages in its mailbox queue, receives the message from operating system B, interprets the message (whose value indicates "wake up"), and takes steps to wake operating system A and core A. Operating system B puts itself to sleep after it sends the wake-up message to operating system A or, alternatively, waits for a sleep message from operating system A.

Example 2

Figure 2:
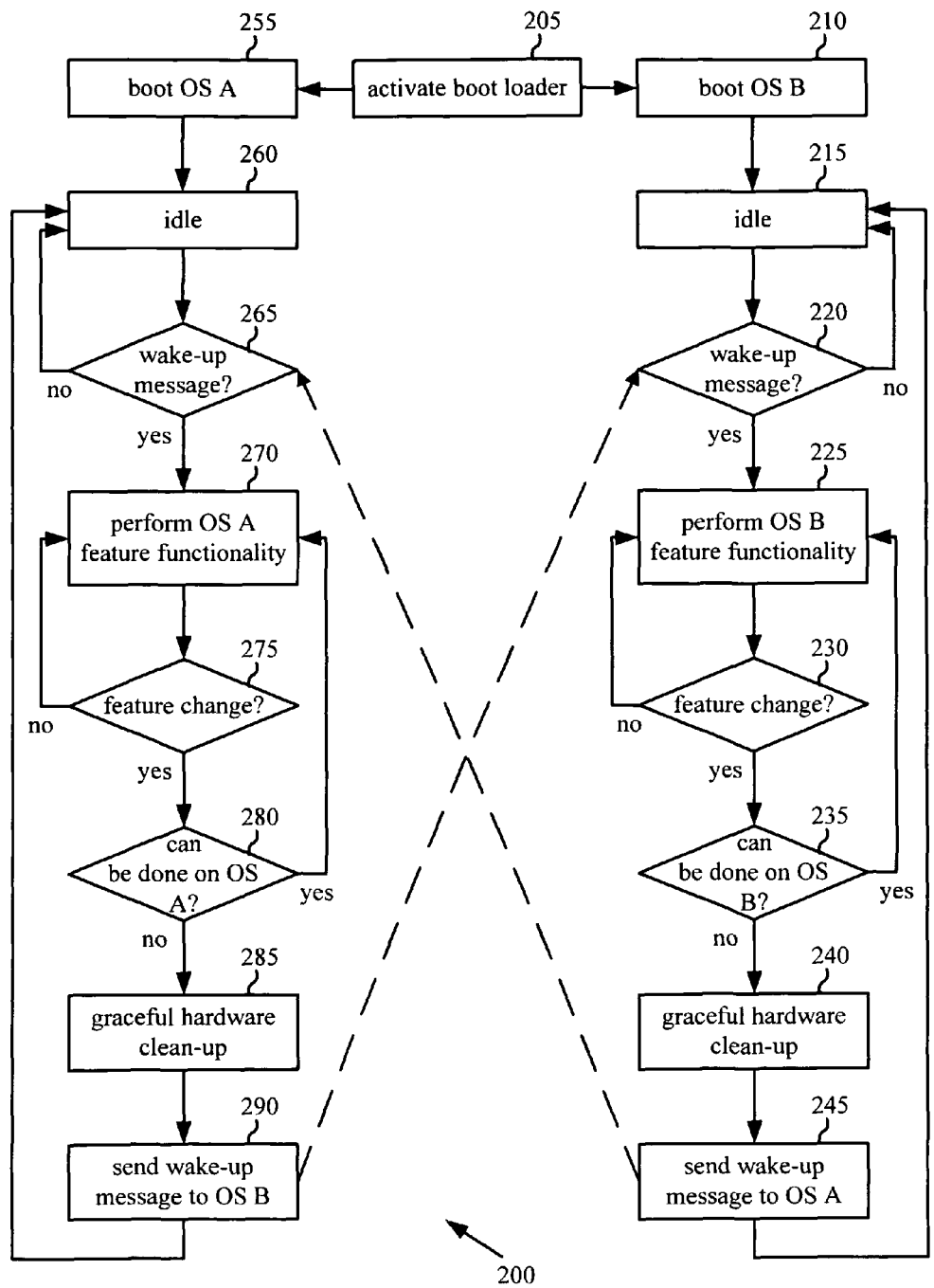
FIG. 2 is a flow chart showing an example technique for a "graceful-handoff" model of handling feature changes between different operating systems according to one or more described implementations.

FIG. 2 is a flow chart showing an example technique (200) according to a graceful-handoff model for using features in concurrently running operating systems. The technique (200) shown in FIG. 2 differs in some respects from the steps in Example 1, above, while still achieving a smooth transition between two operating systems.

In the technique (200), a boot loader is activated (205) and operating systems A and B are booted (210, 255). In FIG. 2, the operating systems start in an idle state (215, 260). Either of the operating systems can be woken up from the idle state (215, 260) by a wake-up message (220, 265) from the other operating system. This can occur, for example, when a user requests an operation, performs a navigation action, checks or changes a configuration setting, or changes media content (e.g., by changing a disc).

After waking, the activated operating system performs (225 or 270) feature functionality enabled using that operating system. Upon detecting a feature change (230 or 275), the activated operating system checks (235 or 280) whether it can perform the new feature. If not, the operating system prepares (240 or 285) hardware resources, as necessary, for transition to the other operating system, and sends a wake-up message (245 or 290) to the other operating system. The operating system that sends the wake-up message can then return to an idle state to await a possible wake-up message.

In the example shown in FIG. 2, operating systems A and B initially enter idle states (215, 260) after being booted (210, 255). Alternatively, one or more of the operating systems is initially in an active state. For example, in a video disc player that plays both Blu-ray and HD DVD discs, a first operating system enters an initially active state when an HD DVD disc is in the player when it is turned on. Instead of entering an initial idle state and checking for a wake-up message, the first operating system performs feature functionality enabled using software running on the first operating system (e.g., launching an HD DVD menu, or starting HD DVD playback) until an event occurs that requires another operating system to become active (e.g., a user inserting a Blu-ray disc). Or, a device can be configured such that one operating system is active by default at start up.

2. Warm-Boot Examples

Example 3

In this warm-boot scenario, operating system A and operating system B are configured to run individually, not simultaneously. In this example, operating system A is the primary operating system and currently controls most aspects of the device. It detects that a user is attempting to use a feature provided by operating system B. The process of Example 3 includes the following steps:
1. Store the identified feature requirement in non-volatile storage.
2. Store the operating system requirement in non-volatile storage.
3. Shutdown operating system A.
4. Reboot.
5. Determine (with boot loader) the required operating system by reading the data stored in Step 2, above. In this example, this is operating system B.
6. Boot operating system B.
7. Determine (with operating system B) the feature required by reading the data stored in Step 1, above.
8. Activate, if necessary, and use (with operating system B) the necessary hardware resources to satisfy the feature's requirements. The transition from one operating system to another can be performed gracefully for some hardware resources (e.g., displays), such that their state (e.g., currently displaying a menu) is completely or partially persisted across the handoff from operating system A to operating system B, in order to reduce transition time and/or mitigate negative impact on user experience.
9. Provide (with operating system B) the desired feature.

Example 4

Figure 3:
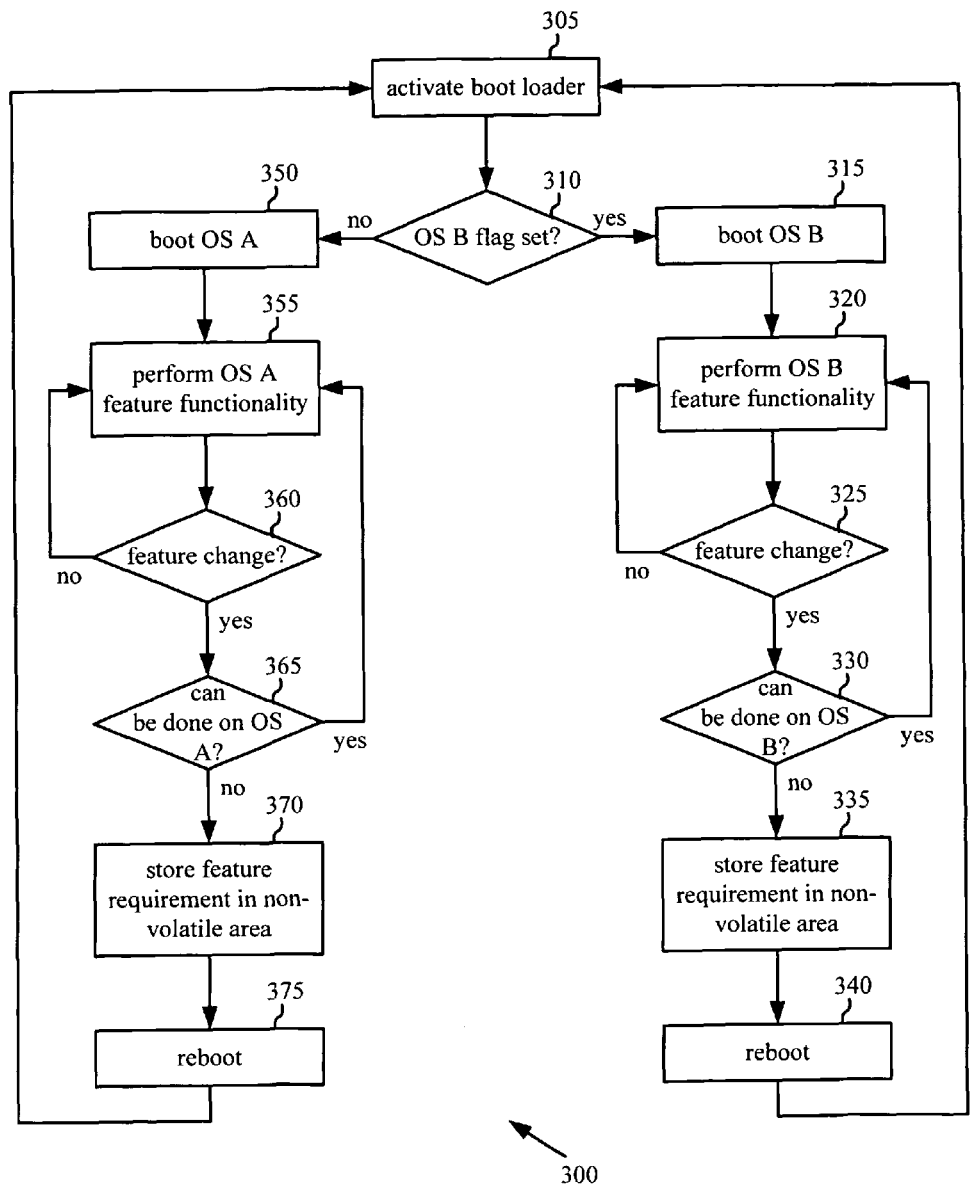
FIG. 3 is a flow chart showing an example technique for a "warm-boot" model of handling feature changes between different operating systems according to one or more described implementations.

FIG. 3 is a flow chart showing an example technique (300) according to a warm-boot model for using features in different operating systems on a device, where the operating systems do not run concurrently. The technique (300) shown in FIG. 3 differs in some respects from the steps in Example 3, above, while still achieving a smooth transition between two operating systems.

In the technique (300), a boot loader is activated (305) and a flag is checked (310) that indicates whether operating system B is to be booted. If the flag is set, the device boots (315) operating system B and performs (320) feature functionality enabled using operating system B. Alternatively, an indicator other than a flag is used to indicate functions that will be performed and/or which operating system will be used.

If a feature change is detected (325), the operating system determines (330) whether it supports the new feature. If it does not support the new feature, information about the feature is stored (335) in non-volatile storage. The boot flag is reset to indicate the other operating system should be used, and a reboot (340) occurs.

On reboot (340), the boot loader is activated (305) and the boot flag indicates (310) that operating system A is to be booted. The device boots (350) operating system A and performs (355) feature functionality enabled using operating system A. If a feature change is detected (360), the operating system determines (365) whether it supports the new feature. If it does not support the new feature, information about the feature is stored (370) in non-volatile storage and the device can reboot (375) to operating system B.

The reboots (340, 375) are warm boots, since they occur after the device has been turned on. One typical characteristic of a warm boot of an operating system is that not everything in the operating system is reinitialized. Examples of warm-boot functionality include "standby" or "hibernate" features in laptop computers—some state gets saved when a laptop computer enters standby or hibernate mode, so that when the laptop computer wakes back up it can more quickly resume normal operation from where it left off.

B. DISCUSSION

Examples 1, 2, 3 and 4 above differ from techniques (sometimes referred to as virtualization techniques) in which one or more operating system environments are hosted by a primary operating system, and all environments share access to the necessary hardware resources. For example, the operating system transitions in Examples 1, 2, 3 and 4 above do not necessarily result from a conscious act by a user to switch operating systems, nor do they involve one operating system hosting another operating system or emulating a platform on which the other operating system runs. The user need not have any awareness of multiple operating systems being available on the device.

Some advantages and improvements for described implementations include reduction in the amount of time to perform transitions between operating systems needed for specific functionality, as well as making operating system transitions unobtrusive to users.

Consider an example device which uses two operating systems in order to cover a range of features. In this example device, operating system A supports optical disc media playback, while operating system B supports internet browsing. While a user is browsing the internet, operating system B is in control of the device. If the user then inserts an optical disc and hits the "Play" button on the device, the user will typically expect optical media playback to occur without a specific action by the user to switch from operating system B to operating system A. Described implementations allow the operating system transition and selection to be hidden from the user.

Typically, when an operating system boots and device drivers are loaded, the device driver will initialize the hardware to a known state. In the case of a user-visible screen or external display, this initialization may result in a user-perceivable flicker, or it may cause an external display to momentarily lose synchronization with the device's signal. By changing the device driver implementation for each operating system instance, the initialization phase can be made to account for a current display state and not perform unnecessary initialization steps which would result in flicker, corruption, or loss-of-signal. This is one example of how the reboot sequence can be designed to make the transition between operating systems less noticeable to a user.

III. Example Implementations for Audio and Video Playback Devices

This section includes specific examples of techniques and tools for handling operating system transitions for media devices that handle different media formats (e.g., video disc formats) for audio and video playback. In alternative implementations, the steps shown in the examples below can be reordered, omitted or replaced with different steps.

For example, examples that describe switching from a second operating system to a first operating system can be extended to switch back to the second operating system by default after a requested feature supported with the first operating system is no longer being used, or in response to a subsequent user action that uses a feature supported with the second operating system. Transitions between operating systems can continue as long as needed or desired. Examples that designate the second operating system as an initial primary operating system can be modified to designate the first operating system as the initial primary operating system, or vice versa. As another alternative, devices can use operating systems other than the first two operating systems to support different media formats. Examples in this section describe performing playback operations (e.g., HD DVD, Blu-ray or DVD video playback or CD audio playback), but the operating systems may perform other operations specific to a particular operating system or common to two or more operating systems. Examples in this section describe disc changes as events that may trigger a transition between operating systems, but other events also may trigger transitions between operating systems, such as user selection of a feature supported with a particular operating system. Examples in this section describe switching between two operating systems, but it is possible to switch between more than two operating systems.

A. Graceful Handoff for Media Format Changes

In some implementations, a graceful-handoff model for media format changes includes a multi-core selection process where two or more processing cores each run a different operating system that supports a different media format. The graceful-handoff model can result in shorter load times for content in different formats.

Figure 4:
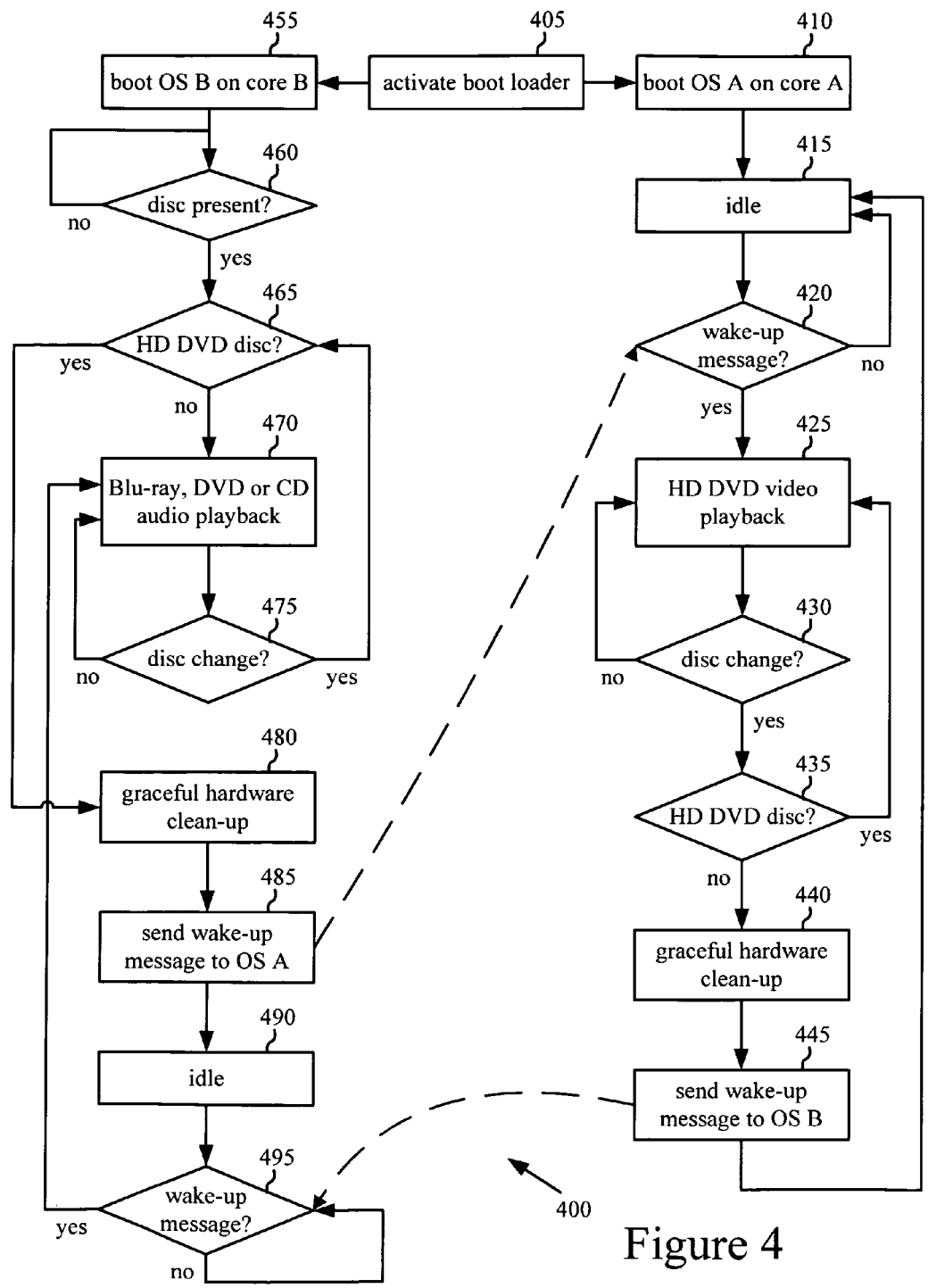
FIG. 4 is a flow chart showing an example technique for graceful-handoff handling of disc format changes according to one or more described implementations.

FIG. 4 is a flow chart showing an example technique (400) for graceful-handoff handling of transitions in a device that uses a first operating system for playing HD DVD discs and a second operating system for playing discs of other disc formats. In the example shown in FIG. 4, a boot loader is activated (405) and the operating systems A and B are booted (410, 455). Operating system B initially checks (460) whether a disc is present in the device. If a disc is present, operating system B determines (465) whether the disc is an HD DVD disc. If the disc is not an HD DVD disc, operating system B can perform feature functionality supported using that operating system (e.g., Blu-ray, DVD or CD audio playback (470)). Upon detecting a disc change (475), the operating system determines (465) whether the new disc is an HD DVD disc.

When operating system B is checking for a disc at startup or after a disc change, if the disc is an HD DVD disc the operating system prepares (480) hardware resources, as necessary, for transition to operating system A and sends a wake-up message (485) to operating system A. Operating system B enters an idle state (490) and checks (495) for a wake-up message from operating system A. After waking, operating system B can again perform feature functionality supported using that operating system (e.g., Blu-ray, DVD or CD audio playback (470)).

In the example shown in FIG. 4, when operating system A is booted, it initially enters an idle state (415). Operating system A checks (420) for a wake-up message from operating system B. After waking, operating system A can perform feature functionality supported using that operating system (e.g., HD DVD video playback (425)).

Upon detecting a disc change (430), the operating system checks (435) whether the new disc is an HD DVD disc. If not, the operating system prepares (440) hardware resources, as necessary, for transition to operating system B and sends a wake-up message (445) to operating system B. Operating system A can then return to an idle state (415) to await a possible wake-up message.

In some implementations, a goal of the idle states for each operating system is to avoid accessing hardware in the device when the respective operating system is idle. For example, while one operating system is accessing the optical drive unit, other operating systems in idle states can be prevented from accessing the drive. Idle states can be handled in different ways. For example, device drivers in the operating system may be coded to support an idle mode. Or, if the operating system supports dynamically loading and unloading device drivers, the driver can be unloaded to prevent the operating system from accessing the underlying hardware. Or, an operating system can be put to sleep: some operating systems allow their states to be saved to memory and then stopped, to be later quickly restarted. Such sleep features include the hibernate features in Windows® operating systems from Microsoft Corporation.

The same mechanism does not need to be used to implement idle states in each operating system on a device. For example, hibernation may be supported by one operating system, while another operating system only supports loading and unloading drivers. An operating system supporting hibernation can implement an idle mode by entering a hibernation state, while another operating system can implement an idle mode by unloading device drivers. A combination of device driver unloading and drivers directly supporting an idle mode can be used, for example, in a case where only a subset of device drivers on an operating system can be unloaded.

An alternative to this model is to abstract hardware components in the device to go through a layer of firmware. The drivers in the operating system can communicate with the abstracted components, instead of directly with the hardware. This is similar to a BIOS concept, to operating system virtualization environments, or to a model used in systems where device access is abstracted through a layer that allows the physical bus to be tunneled over another mechanism (e.g., so that a networking driver may communicate with a network card on the far side of a USB bus). The idle mode functionality can then be implemented in the intermediate layer that abstracts access to the devices.

Figure 5:
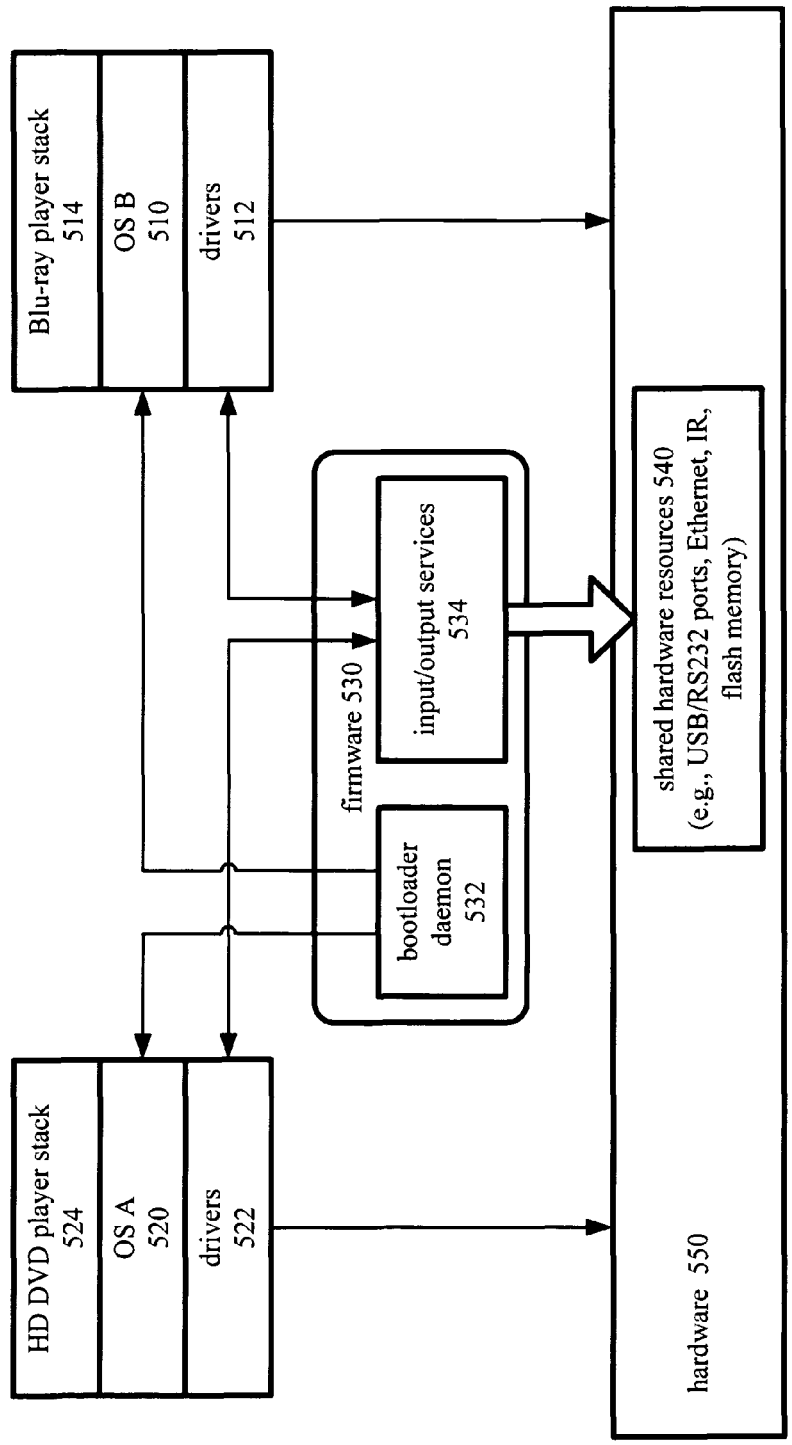
FIG. 5 is a system diagram showing firmware with a boot loader and BIOS services for handling disc format changes according to one or more described implementations.

FIG. 5 shows an example of a dual-boot device (500) with a dual core design with firmware (530) and shared hardware resources (540). Referring to FIG. 5, a second operating system (510) (such as a Linux-based operating system, other Unix-like or Unix variant operating system, or other operating system) supports a Blu-ray player stack (514) and drivers (512) specific to the second operating system (510). A first operating system (520) (such as the Windows® CE operating system or other operating system) supports an HD DVD player stack (524) and drivers (522) specific to the first operating system (520). The firmware (530) includes a boot loader daemon (532) and exposes input/output services (534). The firmware (530) has no affiliation with any specific operating system and is used to arbitrate a boot-loading and disc ID detection state machine. The input/output services (534) allow a single point of entry to shared hardware resources (540) of the device hardware (550) for both operating systems (510, 520). The input/output services (534) are similar to existing BIOS services. The input/output services (534) are simple but powerful enough to allow different operating system-specific drivers (512, 522) to be ported without sacrificing too much performance or incurring too many fundamental changes to an existing driver. Simple read/write/open/close semantics are used, such as those associated with the "ioctl" system call found on Unix systems, which allows an application to control or communicate with a device driver.

The graceful-handoff model may use additional memory, modifications to operating systems to deal with hardware resource sharing, and/or communication overhead between operating systems to coordinate handoffs, but can decrease transition times and improve user experience. To reduce engineering costs, it is often desirable to do as little work as possible in the operating system. Using standard device drivers is often preferred.

B. Warm-Boot Model for Media Format Changes

Figure 6:
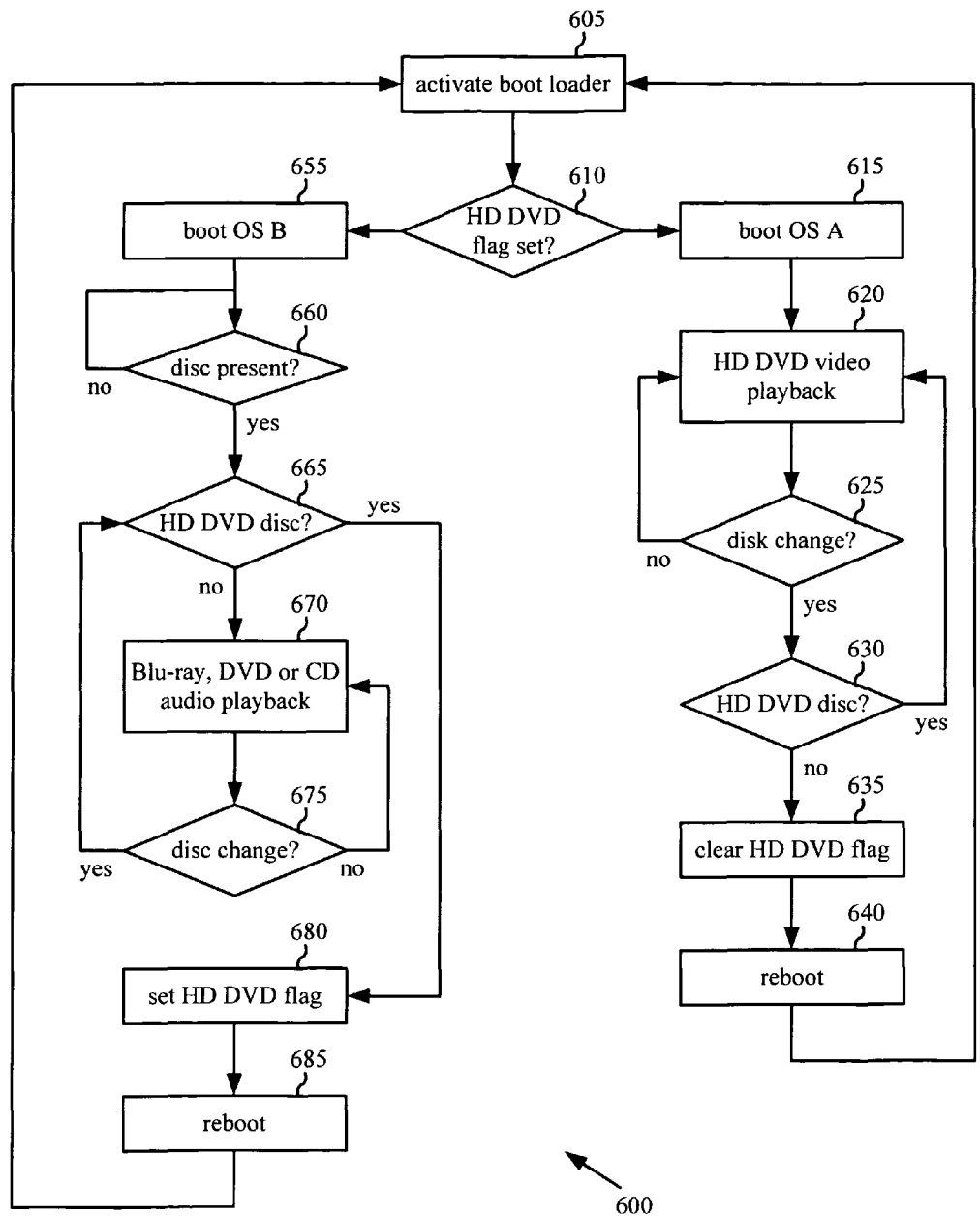
FIG. 6 is a flow chart showing an example technique for warm-boot handling of disc format changes according to one or more described implementations.

FIG. 6 is a flow chart showing an example technique (600) for handling disc format changes in a device having first and second operating systems available according to a warm-boot model, where the operating systems do not run concurrently. In the technique (600), a boot loader is activated (605) and a flag is checked (610) that indicates whether HD DVD playback will be performed. If the flag is set, the device boots (615) a first operating system and performs functionality supported by the first operating system (e.g., HD DVD playback (620)). Alternatively, an indicator other than a flag is used to indicate functions that will be performed and/or which operating system will be used. If a disc change is detected (625), the operating system determines (630) whether it supports the new disc. If it does not support the new disc, the HD DVD flag is cleared (635), and on reboot (640) the boot loader is activated (605) and the cleared HD DVD flag indicates (610) that the second operating system is to be booted.

After reboot (640), or if the HD DVD flag is initially not set, the device boots (655) the second operating system. The second operating system initially checks (660) whether a disc is present in the device. If a disc is present, the second operating system determines (665) whether the disc is an HD DVD disc. If the disc is not an HD DVD disc, the second operating system can perform feature functionality specific to that operating system (e.g., Blu-ray, DVD or CD Audio playback (670)). Upon detecting a disc change (675), the operating system determines (665) whether the new disc is an HDDVD disc.

When the second operating system is checking for a disc at startup or after a disc change, if the disc is an HD DVD disc the operating system sets (680) the HD DVD flag, and on reboot (685) the boot loader is activated (605) and the HD DVD flag indicates (610) that the first operating system is to be booted.

The reboots (640, 685) are warm boots, since they occur after the device has been turned on. Alternatively, logic can be used that loads and launches operating systems directly, rather than cycling back through the boot loader.

On reboots or other loading and launching of different operating systems, the states of some hardware resources may be persisted completely or partially across the control of the different operating systems to mitigate negative impact on user experience. For example, the state of a High-Definition Multimedia Interface ("HDMI") controller may not be reset, or the state of a front-panel display may not be reset.

Several alternatives and extensions to the warm-boot model described above are possible. For example, disc type identification can be written once and exist in the boot loader for the device. The boot loader can choose the correct operating system based on the disc type identification. A disc change can be handled with a shut-down and reboot in order to get boot loader logic, which may simplify the engineering effort to build the device.

As another example, time consuming operations can be parallelized. For example, loading the operating system and playback application from memory and the process of identifying the media type may take considerable time.

FIG. 7 is a flow chart showing an example technique (700) for performing warm-boot media format switching operations in parallel. In the example shown in FIG. 7, a playback application supported by a current operating system is initially running. A disc tray is opened (710), and the device halts (720) the current playback processor, stopping the playback application. (This step is optional, but may be desirable to free some memory for the next step.) The device starts loading (730) another operating system into memory (if there is enough free memory). When new media is inserted (740), the system identifies the media type (750). The operating system loading (730) can be a lengthy operation, so the device does not block on operating system loading (730), allowing it to proceed in parallel with one or more other steps (e.g., identification of media type (750)). Media type identification (750) also can be a lengthy operation, so it also proceeds at the same time as one or more other steps (e.g., operating system loading (730)).

The device checks (760) whether the current operating system supports the new media. If the new media type will use the current operating system that is already running, then the loading of the new operating system (730) is aborted (770) and the proper player application is launched for the new media. If the new media type will use the operating system being loaded, the device waits for the operating system to finish loading (780) if necessary and reboots, restarting the new operating system in memory.

Some warm-boot implementations do not rely on a particular hardware platform, require less hardware resources, and have less overall complexity when compared with some graceful-handoff implementations. Some warm-boot implementations may include a cost of increased content load times for different content formats.

IV. Extensions and Alternatives

A device setup application is a potentially complicated software application that is not usually tied to any recorded media. For video disc players, device setup functions are often accessed via a button on a remote control rather than by inserting a setup disc. When a single operating system is running in the device at one time, setup can be implemented on each operating system, which complicates the engineering effort to develop the device, but may yield a better user experience. Or, setup can be implemented on a single operating system, simplifying engineering effort at a possible cost of detracting from the user experience if entering setup requires the device to reboot to the operating system that supports the setup. A hybrid approach can be used to obtain a mix of reduced engineering effort and increased usability. Frequently accessed operations can be implemented on more than one operating system (e.g., enabling/disabling subtitles during playback), and less frequent operations can be implemented on a single operating system (e.g., setting up a network connection). When multiple operating systems are run on a device simultaneously, setup can be implemented on a single operating system and still function regardless of the type of media currently in the device. For example, setup can be implemented on a second operating system running on one CPU core, producing a user interface that is handed off to a first operating system that controls HD DVD playback. The user interface can be displayed instead of, or in addition to (e.g., blended together or in a separate on-screen window) video playback.

A device can implement a combination of warm-boot and graceful-handoff operating system transition techniques. For example, a device can determine whether to use a graceful-handoff transition or a warm-boot transition based on factors such as resource usage, transition time, and potential impact to user experience. In this way, a device can have flexibility in handling transitions between operating systems.

Some media formats require advanced functionality support beyond support for playback and menu navigation, such as Extensible Markup Language ("XML") support, support for ECMAScript (a standardized scripting language), or Java support. Selection of features that require support for these kinds of advanced functionality also can drive operating system transitions.

Use of dual-format discs can result in events that trigger operating system transitions similar to events associated with disc changes. Techniques and tools described herein can be used in conjunction with dual-format discs.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
receiving first digital media information at a digital media player having a first operating system in a first idle state in memory and having a second operating system in an active state in memory, the first digital media information being encoded according to a first media format;
waking the first operating system from the first idle state, wherein the first operating system supports media playback for the first media format, and wherein the second operating system supports media playback for a second media format different than the first media format, and wherein the waking the first operating system from the first idle state comprises sending a wakeup message from the second operating system in the active state to the first operating system in the first idle state; and
playing the first digital media information using a first application running in an operating environment provided by the first operating system.

2. The method of claim 1 further comprising:
placing the second operating system in a second idle state so as to free resources for use by the first operating system.

3. The method of claim 2 further comprising:
receiving second digital media information at the digital media player, the second digital media information being encoded according to the second media format;
placing the first operating system in the first idle state so as to free resources for use by the second operating system;
waking the second operating system from the second idle state;

playing the second digital media information using a second application running in an operating environment provided by the second operating system.

4. The method of claim 2 further comprising:
receiving a request for a navigation or configuration feature;
placing the first operating system in the first idle state so as to free resources for use by the second operating system;
waking the second operating system from the second idle state; and
presenting a menu for the navigation or configuration feature in an operating environment provided by the second operating system.

5. The method of claim 1 wherein the digital media player is a stand-alone device, a part of a communications device or a part of a display device.

6. The method of claim 1 wherein the first digital media information comprises high-definition video content, and wherein the first media format is a high-definition video format.

7. The method of claim 1 wherein the waking the first operating system from the first idle state is responsive to identification of the first media format in which the first digital media information is encoded.

8. The method of claim 1 wherein the waking the first operating system from the first idle state is responsive to user selection of a navigation or configuration feature supported by the first operating system.

9. A method comprising:
receiving first digital media information at a digital media player having a first operating system stored in non-volatile storage and a second operating system stored in non-volatile storage, the second operating system running in an active state in memory;
identifying a first media format according to which the first digital media information is encoded, wherein playback for the first media format is supported by the first operating system, and wherein playback for a second media format different than the first media format is supported by the second operating system;
responsive to the identifying, loading the first operating system into memory from the non-volatile storage, wherein the first operating system provides an operating environment for playing the first digital media information when the first operating system is running in an active state in memory;
receiving a request for a navigation or configuration feature;
shutting down the first operating system;
loading the second operating system into memory from the non-volatile storage, wherein the second operating system provides an operating environment for presenting a menu for the navigation or configuration feature; and
presenting the menu in the operating environment provided by the second operating system.

10. The method of claim 9 further comprising:
playing the first digital media information using a first application running in the operating environment provided by the first operating system, wherein the first application is operable to decode the first digital media information encoded according to the first media format.

11. The method of claim 9 wherein the digital media player is a stand-alone device, a part of a communications device or a part of a display device.

12. The method of claim 9 wherein the first digital media information comprises high-definition video content, and wherein the first media format is a high-definition video format.

13. The method of claim 9 further comprising shutting down the second operating system before the first operating system is running in an active state in memory.

14. The method of claim 13 further comprising:
receiving second digital media information at the digital media player, the second digital media information being encoded according to the second media format;
identifying the second media format; and
playing the second digital media information using a second application running in an operating environment provided by the second operating system, wherein the second operating system provides the operating environment for playing the second digital media information.

15. A method comprising:
receiving first digital media information at a digital media player having a first operating system in a first idle state in memory and having a second operating system in an active state in memory, the first digital media information being encoded according to a first media format;
waking the first operating system from the first idle state, wherein the first operating system supports media playback for the first media format, and wherein the second operating system supports media playback for a second media format different than the first media format;
persisting a state of at least one of plural hardware components, wherein the at least one hardware component is a display connected to the digital media player, and wherein the persisted state comprises displayed information;
transferring control of the plural hardware components from the second operating system to the first operating system; and
playing the first digital media information using a first application running in an operating environment provided by the first operating system.

16. The method of claim 15 wherein the displayed information comprises a menu.

17. The method of claim 15 wherein a firmware layer provides input/output services to abstract access to the plural hardware components, and wherein the firmware layer implements idle mode functionality for the first idle state.

18. A method comprising:
receiving first digital media information at a digital media player having a first operating system in a first idle state in memory and having a second operating system in an active state in memory, the first digital media information being encoded according to a first media format, wherein the first digital media information comprises high-definition video content, and wherein the first media format is a high-definition video format;
waking the first operating system from the first idle state, wherein the first operating system supports media playback for the first media format, and wherein the second operating system supports media playback for a second media format different than the first media format; and
playing the first digital media information using a first application running in an operating environment provided by the first operating system.

19. A method comprising:
receiving first digital media information at a digital media player having a first operating system in a first idle state in memory and having a second operating system in an active state in memory, the first digital media information being encoded according to a first media format;

waking the first operating system from the first idle state, wherein the waking the first operating system from the first idle state is responsive to identification of the first media format in which the first digital media information is encoded, wherein the first operating system supports media playback for the first media format, and wherein the second operating system supports media playback for a second media format different than the first media format; and playing the first digital media information using a first application running in an operating environment provided by the first operating system.

20. The method of claim 19 further comprising:

placing the second operating system in a second idle state so as to free resources for use by the first operating system.

21. The method of claim 20 further comprising:

receiving second digital media information at the digital media player, the second digital media information being encoded according to the second media format;

placing the first operating system in the first idle state so as to free resources for use by the second operating system;

waking the second operating system from the second idle state;

playing the second digital media information using a second application running in an operating environment provided by the second operating system.

22. The method of claim 20 further comprising:

receiving a request for a navigation or configuration feature;

placing the first operating system in the first idle state so as to free resources for use by the second operating system;

waking the second operating system from the second idle state; and presenting a menu for the navigation or configuration feature in an operating environment provided by the second operating system.

23. The method of claim 19 wherein the digital media player is a stand-alone device, a part of a communications device or a part of a display device.

24. The method of claim 19 wherein the first digital media information comprises high-definition video content, and wherein the first media format is a high-definition video format.

25. A method comprising:

receiving first digital media information at a digital media player having a first operating system in a first idle state in memory and having a second operating system in an active state in memory, the first digital media information being encoded according to a first media format;

waking the first operating system from the first idle state, wherein the first operating system supports media playback for the first media format, and wherein the second operating system supports media playback for a second media format different than the first media format, and wherein the waking the first operating system from the first idle state is responsive to user selection of a navigation or configuration feature supported by the first operating system; and playing the first digital media information using a first application running in an operating environment provided by the first operating system.

26. The method of claim 25 further comprising:

placing the second operating system in a second idle state so as to free resources for use by the first operating system.

27. The method of claim 26 further comprising:

receiving second digital media information at the digital media player, the second digital media information being encoded according to the second media format;

placing the first operating system in the first idle state so as to free resources for use by the second operating system;

waking the second operating system from the second idle state;

playing the second digital media information using a second application running in an operating environment provided by the second operating system.

28. The method of claim 25 wherein the digital media player is a stand-alone device, a part of a communications device or a part of a display device.

29. The method of claim 25 wherein the first digital media information comprises high-definition video content, and wherein the first media format is a high-definition video format.

30. One or more computer-readable storage media storing computer-executable instructions that, when executed by a computing system that implements digital media processing, cause the computing system to perform a method, the method comprising:

receiving first digital media information at the computing system, the computing system having a first operating system in a first idle state in memory and having a second operating system in an active state in memory, the first digital media information being encoded according to a first media format;

waking the first operating system from the first idle state, wherein the first operating system supports media playback for the first media format, and wherein the second operating system supports media playback for a second media format different than the first media format, and wherein the waking the first operating system from the first idle state comprises sending a wakeup message from the second operating system in the active state to the first operating system in the first idle state; and playing the first digital media information using a first application running in an operating environment provided by the first operating system.

31. The computer-readable storage media of claim 30 wherein the method further comprises:

placing the second operating system in a second idle state so as to free resources for use by the first operating system.

32. The computer-readable storage media of claim 31 wherein the method further comprises:

receiving second digital media information at the computing system, the second digital media information being encoded according to the second media format;

placing the first operating system in the first idle state so as to free resources for use by the second operating system;

waking the second operating system from the second idle state;

playing the second digital media information using a second application running in an operating environment provided by the second operating system.

33. The computer-readable storage media of claim 31 wherein the method further comprises:

receiving a request for a navigation or configuration feature;

placing the first operating system in the first idle state so as to free resources for use by the second operating system;

waking the second operating system from the second idle state; and presenting a menu for the navigation or configuration feature in an operating environment provided by the second operating system.

34. The computer-readable storage media of claim 30 wherein the computing system is a stand-alone device, a part of a communications device or a part of a display device.

35. The computer-readable storage media of claim 30 wherein the first digital media information comprises high-definition video content, and wherein the first media format is a high-definition video format.

36. The computer-readable storage media of claim 30 wherein the waking the first operating system from the first idle state is responsive to identification of the first media format in which the first digital media information is encoded.

37. The computer-readable storage media of claim 30 wherein the waking the first operating system from the first idle state is responsive to user selection of a navigation or configuration feature supported by the first operating system.

38. A digital media player comprising:
one or more processing units; and
the computer-readable storage media of claim 30, wherein the computer-executable instructions are executable by the processing units.

39. One or more computer-readable storage media storing computer-executable instructions that, when executed by a computing system that implements digital media processing, cause the computing system to perform a method, the method comprising:
receiving first digital media information at the computing system, the computing system having a first operating system stored in non-volatile storage and a second operating system stored in non-volatile storage, the second operating system running in an active state in memory;
identifying a first media format according to which the first digital media information is encoded, wherein playback for the first media format is supported by the first operating system, and wherein playback for a second media format different than the first media format is supported by the second operating system;
responsive to the identifying, loading the first operating system into memory from the non-volatile storage, wherein the first operating system provides an operating environment for playing the first digital media information when the first operating system is running in an active state in memory;
receiving a request for a navigation or configuration feature;
shutting down the first operating system;
loading the second operating system into memory from the non-volatile storage, wherein the second operating system provides an operating environment for presenting a menu for the navigation or configuration feature; and
presenting the menu in the operating environment provided by the second operating system.

40. The computer-readable storage media of claim 39 wherein the method further comprises:
playing the first digital media information using a first application running in the operating environment provided by the first operating system, wherein the first application is operable to decode the first digital media information encoded according to the first media format.

41. The computer-readable storage media of claim 39 wherein the computing system is a stand-alone device, a part of a communications device or a part of a display device.

42. The computer-readable storage media of claim 39 wherein the first digital media information comprises high-definition video content, and wherein the first media format is a high-definition video format.

43. The computer-readable storage media of claim 39 wherein the method further comprises shutting down the second operating system before the first operating system is running in an active state in memory.

44. The computer-readable storage media of claim 39 wherein the method further comprises:
receiving second digital media information at the computing system, the second digital media information being encoded according to the second media format;
identifying the second media format; and
playing the second digital media information using a second application running in an operating environment provided by the second operating system, wherein the second operating system provides the operating environment for playing the second digital media information.

45. A digital media player comprising:
one or more processing units; and
the computer-readable storage media of claim 39, wherein the computer-executable instructions are executable by the processing units.

46. One or more computer-readable storage media storing computer-executable instructions that, when executed by a computing system that implements digital media processing, cause the computing system to perform a method, the method comprising:
receiving first digital media information at the computing system, the computing system having a first operating system in a first idle state in memory and having a second operating system in an active state in memory, the first digital media information being encoded according to a first media format;
waking the first operating system from the first idle state, wherein the first operating system supports media playback for the first media format, and wherein the second operating system supports media playback for a second media format different than the first media format;
persisting a state of at least one of plural hardware components, wherein the at least one hardware component is a display connected to the digital media player, and wherein the persisted state comprises displayed information;
transferring control of the plural hardware components from the second operating system to the first operating system; and
playing the first digital media information using a first application running in an operating environment provided by the first operating system.

47. The computer-readable storage media of claim 46 wherein the displayed information comprises a menu.

48. The computer-readable storage media of claim 46 wherein a firmware layer provides input/output services to abstract access to the plural hardware components, and wherein the firmware layer implements idle mode functionality for the first idle state.

49. A digital media player comprising:
one or more processing units; and
the computer-readable storage media of claim 46, wherein the computer-executable instructions are executable by the processing units.

50. One or more computer-readable storage media storing computer-executable instructions that, when executed by a computing system that implements digital media processing, cause the computing system to perform a method, the method comprising:

receiving first digital media information at the computing system, the computing system having a first operating system in a first idle state in memory and having a second operating system in an active state in memory, the first digital media information being encoded according to a first media format, wherein the first digital media information comprises high-definition video content, and wherein the first media format is a high-definition video format;

waking the first operating system from the first idle state, wherein the first operating system supports media playback for the first media format, and wherein the second operating system supports media playback for a second media format different than the first media format; and playing the first digital media information using a first application running in an operating environment provided by the first operating system.

51. A digital media player comprising:

one or more processing units; and the computer-readable storage media of claim 50, wherein the computer-executable instructions are executable by the processing units.

52. One or more computer-readable storage media storing computer-executable instructions that, when executed by a computing system that implements digital media processing, cause the computing system to perform a method, the method comprising:

receiving first digital media information at the computing system, the computing system having a first operating system in a first idle state in memory and having a second operating system in an active state in memory, the first digital media information being encoded according to a first media format;

waking the first operating system from the first idle state, wherein the waking the first operating system from the first idle state is responsive to identification of the first media format in which the first digital media information is encoded, wherein the first operating system supports media playback for the first media format, and wherein the second operating system supports media playback for a second media format different than the first media format; and playing the first digital media information using a first application running in an operating environment provided by the first operating system.

53. The computer-readable storage media of claim 52 wherein the method further comprises:

placing the second operating system in a second idle state so as to free resources for use by the first operating system.

54. The computer-readable storage media of claim 53 wherein the method further comprises:

receiving second digital media information at the computing system, the second digital media information being encoded according to the second media format;

placing the first operating system in the first idle state so as to free resources for use by the second operating system;

waking the second operating system from the second idle state;

playing the second digital media information using a second application running in an operating environment provided by the second operating system.

55. The computer-readable storage media of claim 53 wherein the method further comprises:

receiving a request for a navigation or configuration feature;

placing the first operating system in the first idle state so as to free resources for use by the second operating system;

waking the second operating system from the second idle state; and presenting a menu for the navigation or configuration feature in an operating environment provided by the second operating system.

56. The computer-readable storage media of claim 52 wherein the computing system is a stand-alone device, a part of a communications device or a part of a display device.

57. The computer-readable storage media of claim 52 wherein the first digital media information comprises high-definition video content, and wherein the first media format is a high-definition video format.

58. A digital media player comprising:

one or more processing units; and the computer-readable storage media of claim 52, wherein the computer-executable instructions are executable by the processing units.

59. One or more computer-readable storage media storing computer-executable instructions that, when executed by a computing system that implements digital media processing, cause the computing system to perform a method, the method comprising:

receiving first digital media information at the computing system, the computing system having a first operating system in a first idle state in memory and having a second operating system in an active state in memory, the first digital media information being encoded according to a first media format;

waking the first operating system from the first idle state, wherein the first operating system supports media playback for the first media format, and wherein the second operating system supports media playback for a second media format different than the first media format, and wherein the waking the first operating system from the first idle state is responsive to user selection of a navigation or configuration feature supported by the first operating system; and playing the first digital media information using a first application running in an operating environment provided by the first operating system.

60. The computer-readable storage media of claim 59 wherein the method further comprises:

placing the second operating system in a second idle state so as to free resources for use by the first operating system.

61. The computer-readable storage media of claim 60 wherein the method further comprises:

receiving second digital media information at the computing system, the second digital media information being encoded according to the second media format;

placing the first operating system in the first idle state so as to free resources for use by the second operating system;

waking the second operating system from the second idle state;

playing the second digital media information using a second application running in an operating environment provided by the second operating system.

62. The computer-readable storage media of claim 59 wherein the computing system is a stand-alone device, a part of a communications device or a part of a display device.

63. The computer-readable storage media of claim 59 wherein the first digital media information comprises high-definition video content, and wherein the first media format is a high-definition video format.

64. A digital media player comprising:
one or more processing units; and
the computer-readable storage media of claim 59, wherein the computer-executable instructions are executable by the processing units.

* * * * *